US005359322A

United States Patent [19]

Murray

[11] Patent Number: 5,359,322

[45] Date of Patent: Oct. 25, 1994

[54] METHOD AND APPARATUS FOR INTERCONNECTED ELECTRONIC LOCKS

[75] Inventor: James S. Murray, South Lyon, Mich.

[73] Assignee: Stanley Home Automation, Novi, Mich.

[21] Appl. No.: 951,813

[22] Filed: Sep. 28, 1992

[51] Int. Cl.[5] .............................................. G06F 7/04

[52] U.S. Cl. ................................ 340/825.31; 70/278; 361/172

[58] Field of Search ...................... 340/825.31, 825.56, 340/825.49; 361/172; 70/278

[56] References Cited

U.S. PATENT DOCUMENTS

| | | | |
|---|---|---|---|
| Re. 29,259 | 6/1977 | Sabsay | 340/825.31 |
| 3,732,542 | 5/1973 | Hedin . | |
| 3,838,395 | 9/1974 | Suttill, Jr. et al. | 340/825.31 |
| 3,842,629 | 10/1974 | Pazer et al. | 340/825.31 |
| 3,906,447 | 9/1975 | Crafton . | |
| 3,919,869 | 11/1975 | Fromm . | |
| 4,392,133 | 7/1983 | Lundgren . | |
| 4,415,893 | 11/1983 | Roland et al. | 340/825.31 |
| 4,717,816 | 1/1988 | Raymond et al. | 340/825.31 |

*Primary Examiner*—Michael Horabik
*Attorney, Agent, or Firm*—Krass & Young

[57] ABSTRACT

A group of cabinets or other units each have a solenoid operated lock controlled by an electronic lock accessible by one or more electronic keys. The locks are linked together in a chain by power and data lines so that power is supplied through a single 12 volt transformer, and key codes are transmitted from a lock that reads a key to other locks, to open any cabinet programmed with an access code matching the transmitted key code. To limit power requirements, when one solenoid is being energized a busy signal is transmitted to prevent concurrent operation of other solenoids. A user installed master code stored in the lock and a corresponding master key are used to permit programming or erasing of other access key codes. A factory installed permanent reset code is stored in the lock and a secret algorithm known only to the manufacturer can derive the reset code from the cabinet serial number. When a master key is lost the user requests a reset key from the manufacturer who must use the secret algorithm to reveal the reset code and make a key containing the reset code. When that key is used, the master and access codes are erased, the lock is opened and the code in the reset key is scrambled to prevent its use for another reset operation.

19 Claims, 6 Drawing Sheets

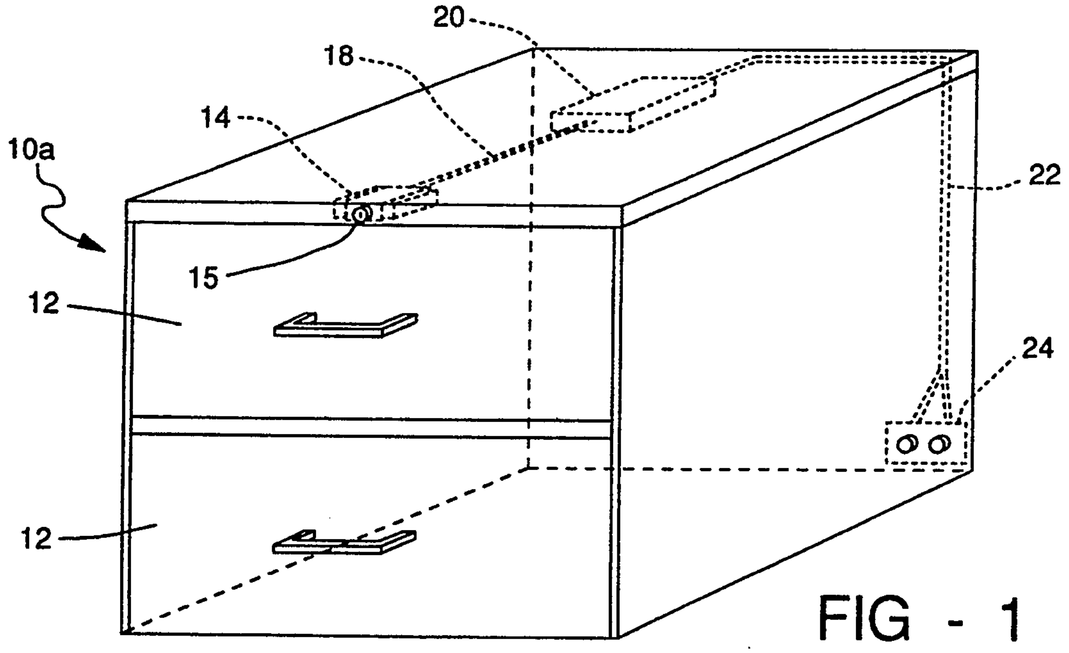
FIG - 1
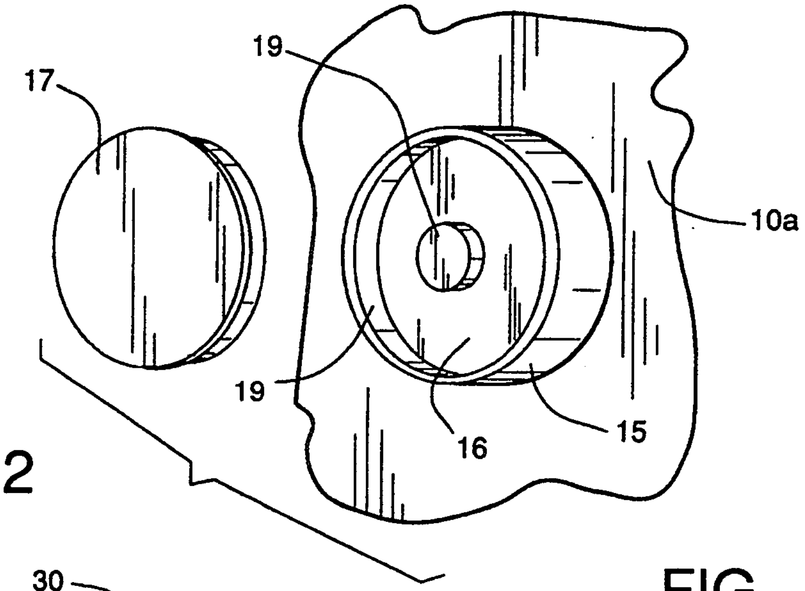
FIG - 2
FIG - 3b
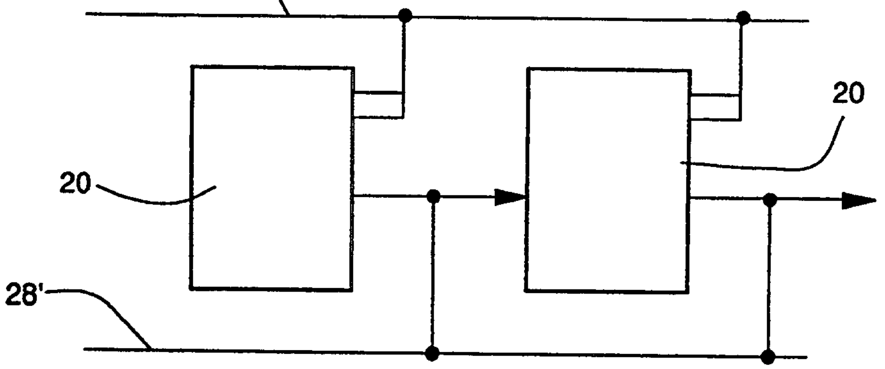

METHOD AND APPARATUS FOR INTERCONNECTED ELECTRONIC LOCKS

FIELD OF THE INVENTION

This invention relates to electronic lock systems and particularly to ,a plurality of interconnected electronic lock units and a method of operation thereof.

BACKGROUND OF THE INVENTION

In offices having a large number of locked file cabinets, desks, appliances, or other units, an inordinate time is consumed each day in opening individual units. This is especially burdensome and inefficient where a single individual is responsible for many cabinets, desks, etc. It is thus desirable to provide a system which allows one person to quickly and easily unlock all or many of the locked units in an area, but it is also often required that other persons be allowed to open smaller subsets of the total number of units.

It is already known to employ electronic locks which respond to magnetically or electrically stored codes. With such technology, opening locks is accomplished by inserting or presenting a key which transmits a code or codes to a lock by touching the key to a lock receptor or by merely approaching the proximity of a lock. While this can relieve some of the burden of unlocking many individual units, much of the burden remains.

SUMMARY OF THE INVENTION

This invention provides relief of the task of opening a large number of locked cabinets, desks or other units without compromising security or giving up flexibility of individual unit access. Each unit is equipped with the same type of electronic lock and the locks are connected by a transmission line carrying data and power. The data may be transmitted serially from each lock to another or to all the other locks. Each lock is a microprocessor based controller having a memory for access codes. One of the units at the end of the series is supplied with 12 volt power via a transformer and supplies that power to the transmission line. A number of electronic keys are each encoded with a unique key code for use by designated persons. Each lock is programmed with one or more stored access codes corresponding to one or more of the key codes. Any individual unit is opened by inserting or presenting a key which has a valid code for the lock of that unit. That lock reads the key code and compares it to its access codes and unlocks the unit when a match is made. In addition, the key code is sent over the transmission line to open any other unit having a corresponding access code.

Two options regarding the code transmission are presented. First, if desired, the key code is passed to the transmission line only if the code is valid for the lock reading the key. Second, if desired, the key code is passed in only one direction to units connected in series. Thus if the key is presented to the first unit of the series (the unit directly coupled to the transformer), it can be transmitted to all of the other units. However, if the key is presented to, say, the third unit in line, it can pass the key code downstream to the units lower in the series but not to the first and second units.

The power transmitted to the units can be very small. The chief user of power is the solenoid or other actuator which opens a lock. To minimize the power, the system limits the opening function to one unit at a time. Each lock produces a busy signal while it opens. The busy signal is transmitted to the other units which are inhibited for the duration of the signal.

BRIEF DESCRIPTION OF THE DRAWINGS

The above and other advantages of the invention will become more apparent from the following description taken in conjunction with the accompanying drawings wherein like references refer to like parts and wherein:

FIG. 1 is an isometric view of a cabinet including an electronically controlled lock according to the invention;

FIG. 2 is an isometric view of an electronic key and a key receptor on the cabinet of FIG. 1;

Figure 4:
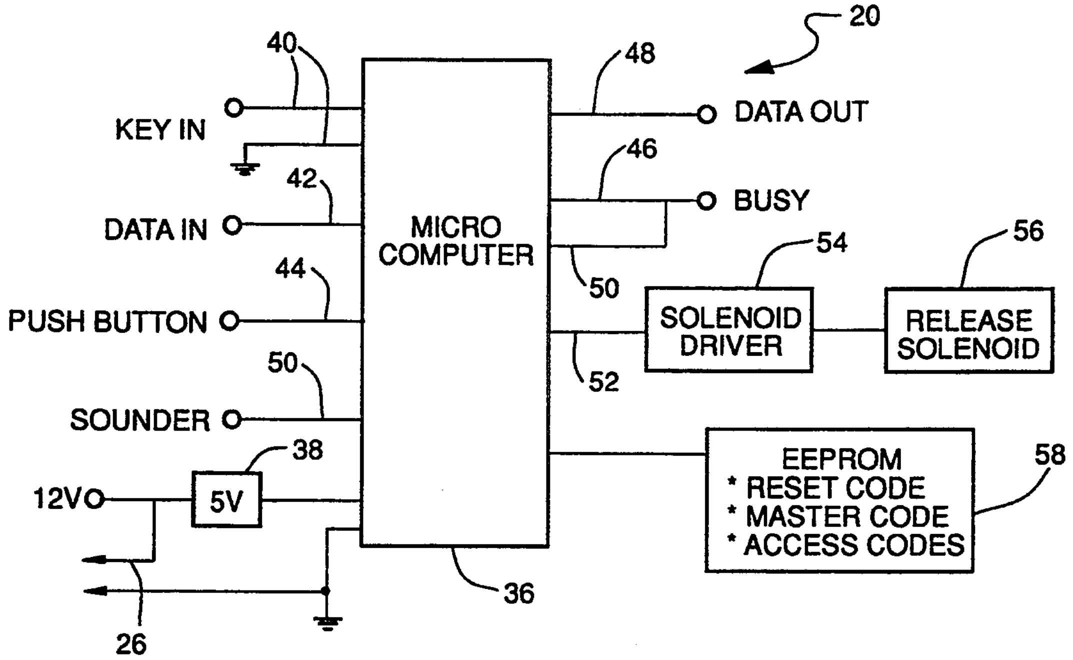
Figure 5:
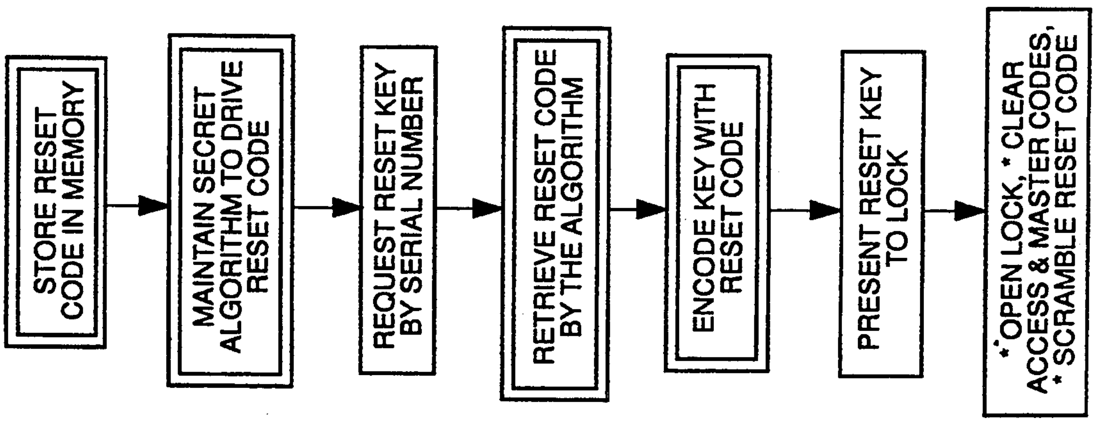
Figure 6B:
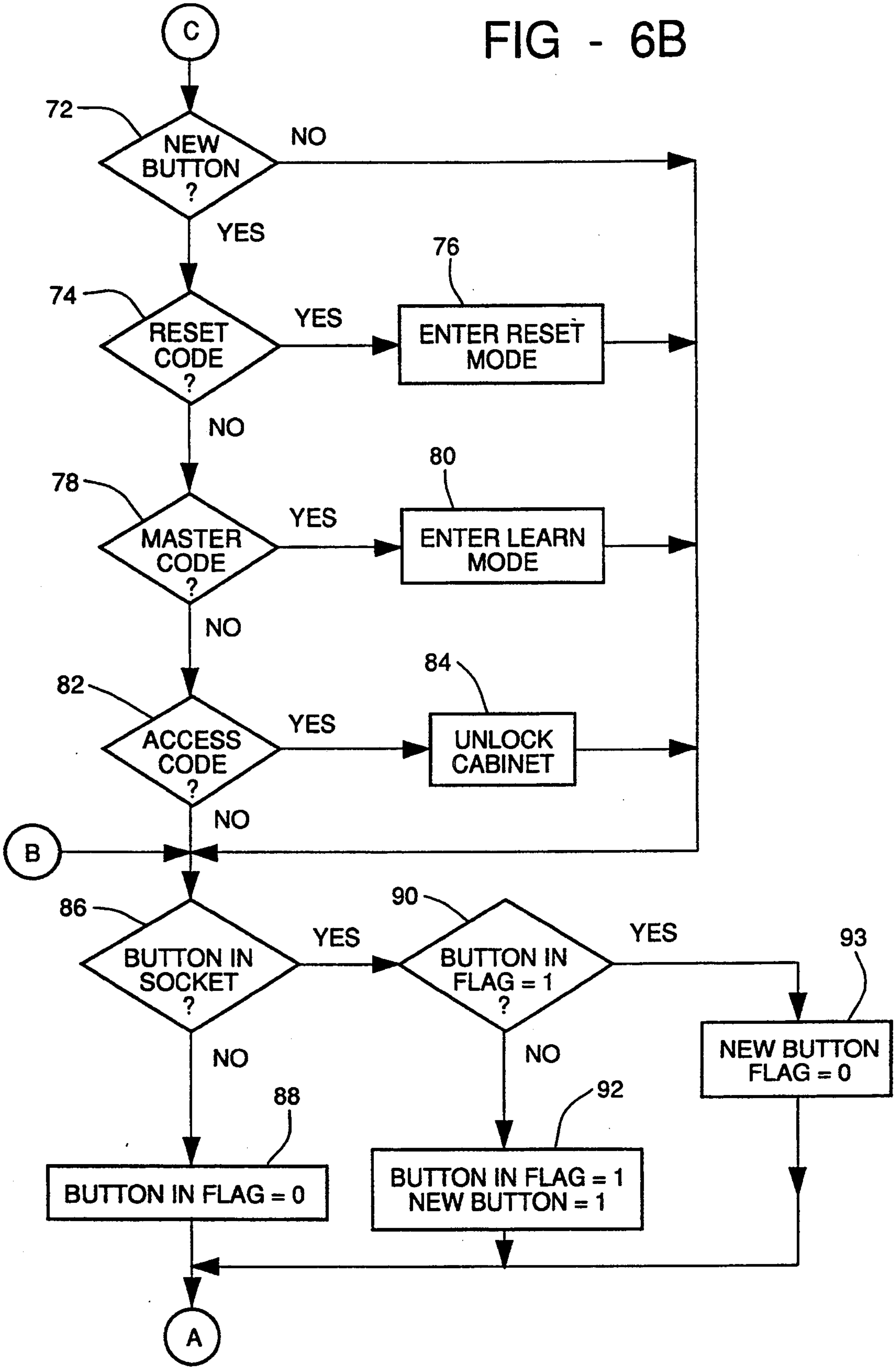

FIGS. *3a* and *3b* are schematic diagrams of a plurality of cabinets with interconnecting locks, according to the invention;

FIG. 4 is a schematic diagram of microcomputer based lock circuitry according to the invention;

FIG. 5 is a chart illustrating the process of managing the reset key code and providing a reset key.

FIGS. *6a*, *6b*, 7, 8, 9, 10, and 11 are flow charts representing a program for the microcomputer of FIG. 4 according to the invention.

DESCRIPTION OF THE INVENTION

While the ensuing description is couched in terms of a lock system for file cabinet, desks, and other office furniture, it applies as well to computers or other appliances and to doors controlling access to rooms, for example. The term "unit" is used herein to mean any item controllable by an electronic lock and connectable into a system of locks.

Referring to FIG. 1, a file cabinet 10*a* has drawers 12 which are locked by a well-known mechanism 14 operable to locked position by a manually depressible plunger 15 and to an open position by a solenoid within the mechanism 14. The lock mechanism 14 is electrically connected by conductors 18 to an electronic lock 20. Both the mechanism 14 and the electronic lock 20 are secured to the inside upper portion of the cabinet 10*a* and are accessible only when the upper drawer is open, except for the plunger 15 which protrudes through the front face of the cabinet. The plunger 15 (FIG. 2) has a front socket 16 for receiving an electronic button 17 or key which engages electrodes 19 on the plunger for communication with the lock 20 via the conductors 18. The lock 20 is connected by lines 22 to connectors 24 in the rear of the cabinet for coupling to a power supply and to other cabinets or other locked units. The key or code button 17 is a two electrode coin-shaped can containing a nonvolatile chip which can read or write to the lock 20 on contact with the socket 16. The key stores a large digital number which is the key code. Such devices are, for example, DS199X Touch Memories available from Dallas Semiconductor Corp., Dallas, Tex. For convenience the buttons may be mounted on an identification card or on a key chain attachment.

The cabinet 10*a* is electrically connected to other cabinets 10*b*, 10*c* . . . 10*n* as shown in FIG. *3a*, the cabinets being connected by power and common lines 26, data lines 28, and a common busy line 30. The first cabinet 10*a* in the series is connected through a 12 volt transformer 32 to a 120 volt line. The 12 volt output is coupled across the power and common lines 26. The data line 28 of the first cabinet is connected only to the second cabinet, etc., so that the data is coupled serially from one cabinet to the next. Each electronic lock 20 in the several cabinets is physically the same but individually programmable with different access codes. Each lock also is equipped with a pushbutton switch 34 which is manually operable and accessible only when the top drawer 12 is open.

FIG. 4 shows the electronic lock circuit 20 which features a microcomputer 36, such as an MC68HC05P9 supplied by Motorola Semiconductor Products, Inc., Phoenix, Ariz. The microcomputer is powered by a 5 volt regulator circuit 38 having an input from the 12 volt line 26. Other inputs comprise a line pair 40 from the electrodes 19 of the socket 16 which carry the key code from the button 17, a "data in" line 42 which receives data from other locks 20 via line 28, a push button input 44 from the pushbutton switch 34, and a busy input 46. Outputs of the microcomputer 38 are "data out" terminal 48 for supplying data to line 28, a busy out terminal 50 coupled to line 30 along with input 46, a sounder output 50, and finally, an unlock output 52 connected to a solenoid driver 54 which furnishes actuating current to a release solenoid 56. A non-volatile memory 58 is also coupled to the microcomputer. Preferably the memory is an electrically erasable programmable read-only memory or EEPROM. The memory has a factory installed, permanently stored reset code, and addresses for a master code and many access codes to be installed by the user. The microcomputer, when properly programmed will read the key code of any key button inserted into the socket 16 and energize the solenoid driver 54 to unlock the cabinet when a valid access key code is received. At the same time, it will output the key code at terminal 48 for transmission to another lock 20; optionally only those key codes that are valid for the reading microcomputer are transmitted. The microcomputers that are not reading the button code receive the transmitted key code and open any locks for which the key code is valid. Whenever any solenoid driver 54 is being activated, a busy signal is sent via lines 30 to the other locks to prevent other solenoid drivers from operation at the same time, thereby minimizing peak current load on the 12 volt supply system.

Figure 3A:
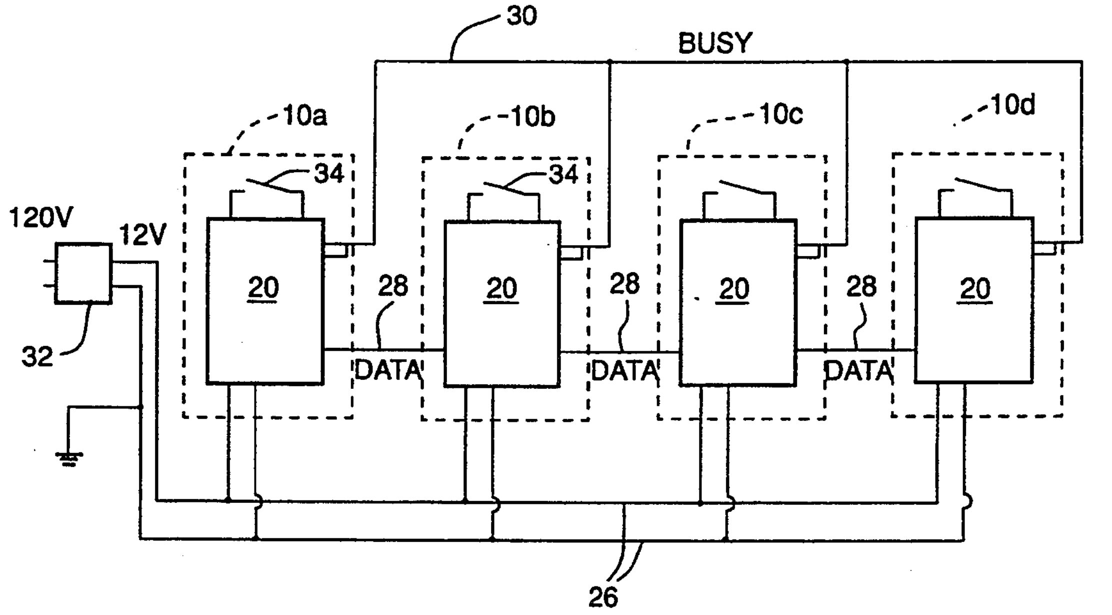

A complete system thus includes a plurality of cabinets or other units 10*a* . . . 10*n*, each having an electronic lock 20, the cabinets being linked together in daisy chain style by transmission lines, and a plurality of key buttons, each having a unique code stored therein. The serial communication link enables the data output of one lock to be coupled to the data input of one other lock, and the other lock is connected in the same way to yet another lock, so that the data flows in just one direction. Such an arrangement permits a key code to be read by any lock and be sent to other locks "downstream". FIG. 3*b* shows a parallel style of communication link wherein a data line 28' is connected to all data inputs and outputs so that all transmitted key codes are available to all the locks. Although it is preferred that a plurality of units are linked together by a transmission line, alternative communication links can be used for data coupling, for example, infrared signals, ultrasonic signals, radio signals, etc.

The microcomputer is programmed to store and respond to three different types of codes. A reset code is permanently stored in the EEPROM at the time of manufacture of the cabinet. All other codes are also stored in the EEPROM and are programmed by the user. Each cabinet has a master code and one or more access codes. To program a master code, the top drawer 12 must be open and the pushbutton 34 manually depressed. Then any button is inserted into the socket 16 and that key code is stored in the EEPROM as the master code for that unit, and that button becomes a master button. Each cabinet may have a different master code or a shared one, depending on the security arrangements of the user.

Access codes can be programmed into the lock when the drawer is closed and either locked or unlocked. First the master button is presented to the lock to initiate a learn mode and then another button is presented to the lock. The code of the other button is stored in the EEPROM as an access code for that specific lock. The process may be repeated for additional buttons to store their key codes as access codes in the EEPROM. If desired, some or all of the same access codes may be used for other cabinets. Thus it is possible to establish a hierarchy of users within an organization: only a few will be allowed to have master buttons, others will have buttons accessing many units, and still other will have buttons accessing only a few units.

The master buttons are used to program new access codes as described, and can also be used to erase all the existing access and master codes in the EEPROM. This is effected by depressing the pushbutton 34, holding the master button in its socket for a predetermined time, and presenting another button to become a new master.

The manufacturer maintains a secret algorithm which derives the reset code from the serial number of the cabinet. Ordinarily, the user has full control of the keys and does not have to use the reset code. However, if a master key or button is lost, the ability to reprogram a unit is also lost. In that case, a button programmed with the reset code is obtained from the manufacturer. The manufacturer must use the secret algorithm to determine the reset code corresponding to the serial number and encode a key with the reset code. The button is placed in the socket of the unit and the microcomputer compares the code to the reset code stored in the EEPROM, and, if a match is obtained, the reset code is scrambled and written into the button, the unit is unlocked, and the master and access codes in the EEPROM are erased. Thus the lock is restored to new condition and may be reprogrammed with new master and access codes. Since the reset button is programmed with a new code, it becomes an ordinary key and may be used as a master or access button. This one-time reset button minimizes the risk of someone having a key with a code that cannot be erased from the EEPROM. This security process is set forth in the chart of FIG. 5 wherein the blocks with double borders identify the steps taken by the manufacturer and the single border blocks are the user steps of resetting a lock.

Figure 6A:
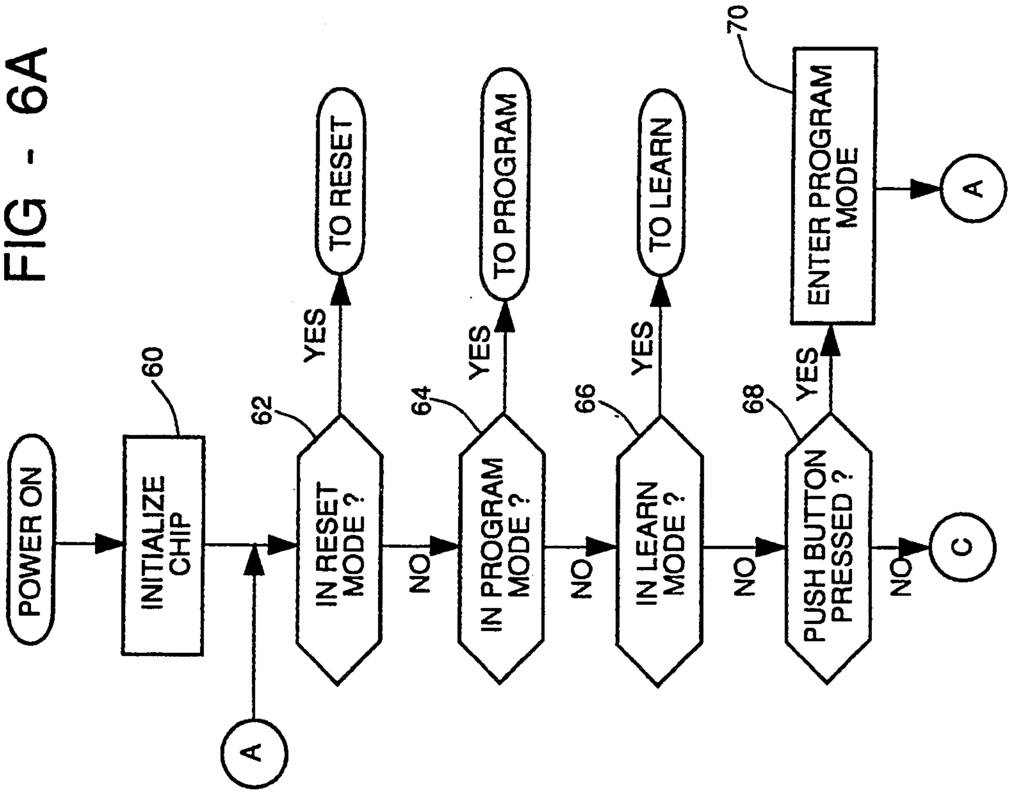

The microcomputer program is represented by the flow charts of FIGS. 6*a*–11. In the flow chart descriptions, numerals in angle brackets <nn> identify the functions of blocks bearing the corresponding reference numerals. FIGS. 6*a* and 6*b*, which are joined at node C, show the overall program for the microcomputer in programming master codes, learning access codes, resetting all codes and opening the lock. When power is first turned on the microcomputer is initialized <60> by setting all flags to zero, reading the contents of the EEPROM 58 into the internal RAM, and setting the program to Idle mode. The program has four mutually exclusive modes, Idle, Reset, Program, and Learn. The program then checks whether it is in Reset mode <62>, Program mode <64> or Learn mode <66>.

Since it is not in any of those modes, it determines whether the pushbutton 34 is pressed <68>. If it is, the Program mode is entered <70> by setting a Program flag and reverting to node A to again check for mode status. If the push button is not pressed, the microcomputer determines whether a New Button flag has been set <72>. If there is a New Button, the key code is compared with the reset code <74> and if there is a match the Reset mode is entered <76>. If there is no match, it is compared with the master code <78> and if a match is found there the Learn mode is entered <80>. If the master code is not matched, the key code is compared with each of the access codes <82> and if there is a match the cabinet is unlocked <84>. If there are no code matches, or there is no new button present <72>, the program enters a routine to determine whether a new button has been inserted. It checks whether there is a button in the socket 16 by checking whether a key code is being input <86>; if not the Button In flag is set to zero <88>. If a button is in the socket, and the Button In flag is not already set to 1 <90>, then it is set to 1 and the New Button flag is set as well <92>. Otherwise the New Button flag is reset to zero and the program returns to node A. Thus the New Button flag is allowed for just one loop of the program and then it is reset.

Figure 7:
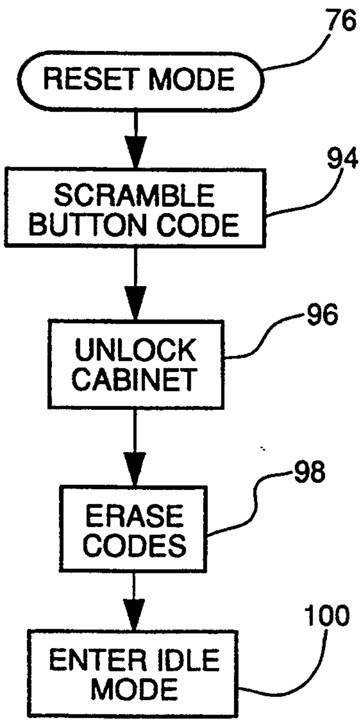

If during the progress through the program loop a Reset, Program or Learn mode flag is set, then the corresponding routine is entered during the next loop. In Reset mode, the program of FIG. 7 is entered. First, the button code is scrambled by the microprocessor and written to the button to thereby give the reset button a new code so that it can no longer serve to reset the lock <94>. Next, the cabinet is unlocked <96> and then the access and master codes in the EEPROM are erased <98>. Finally, Idle mode is entered <100>.

Figure 8:
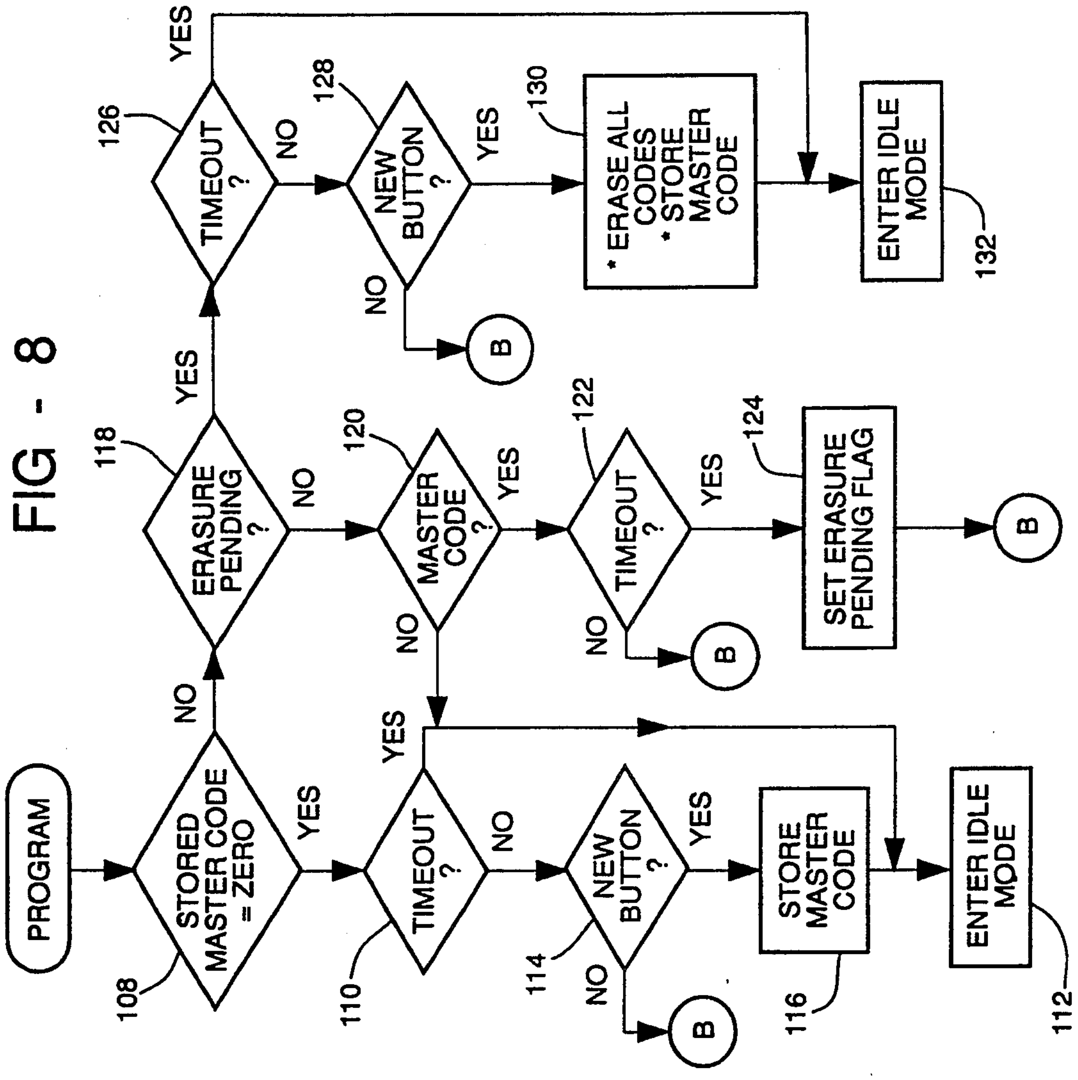

In Program mode, the program illustrated in FIG. 8 is entered. Program mode has two aspects. First, if the unit is new with factory settings or it has just been reset, it has no master code and the Program mode will install one. Second, if the unit has a master code, it can be changed using the master key. In the first case, the master code will be zero <108> or some other specified default value. After the pushbutton 34 is pressed, a button 17 must be placed in the socket 16 within a set time period. If this time expires <110>, the program returns to Idle mode <112>. If the time has not expired, the New Button flag is checked <114> and if it is set, the key code of the button is stored in the EEPROM as the master code <116> and that button becomes the master button for that lock. Then the program returns to Idle mode <112>. If the New Button flag is not set <114> the program returns to node B.

To change the master code, and to erase the access codes as well, the master button must be present for a given time, say, 3 seconds, and then within a second period, say, 30 seconds, a "new button" must be presented, albeit the old master button can be reused for this purpose, if desired. Thus in the second case of the Program mode when the master code is not zero <108>, an Erasure Pending flag is checked <118>. Initially it will not be set. Then if the master code is present <120> long enough for the three second timer to time out <122>, the Erasure Pending flag will be set <124> and the program proceeds to the node B. Subsequent program loops will check the Erasure Pending flag <118> and then test the 30 second timer <126>; if it has not timed out and a New Button flag is set <128> by presenting a button to the lock, all access codes and the master code will be erased and the present key code is installed to become the master code <130>. Then the Idle mode will be entered <132>. If the 30 second timer times out <126>, the Idle mode is entered <132>.

Figure 9:
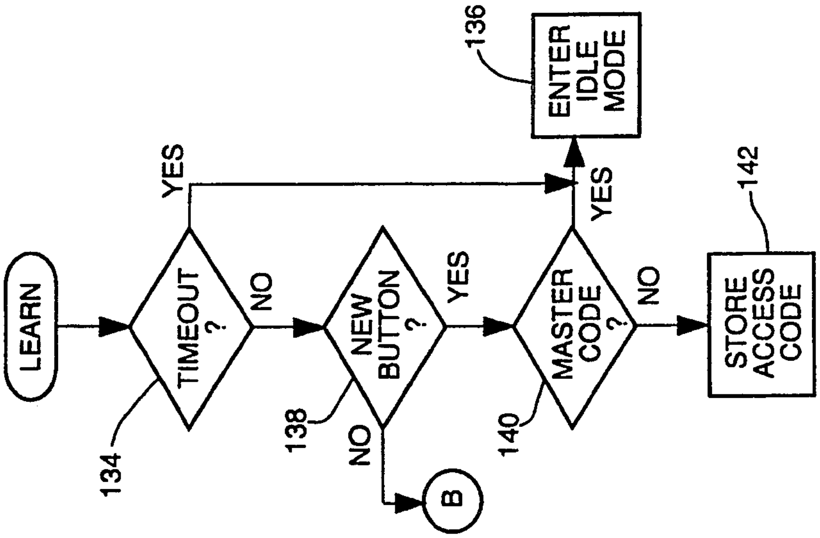

The Learn mode will store the key code of any key other than the master button if it is timely presented to the lock after the Learn mode is entered. As shown in FIG. 9, the Learn mode first checks for timeout <134> and if it has expired the Idle mode is entered <136>. If the time has not expired <134> and a New Button flag is presented <138>, and the new code is not the master code <140>, the new code is stored as an access code <142>. When there is no New Button code <138> the program goes to the node B, or if the key code of the new button is the master code, Idle mode is entered <136>.

Figure 10:
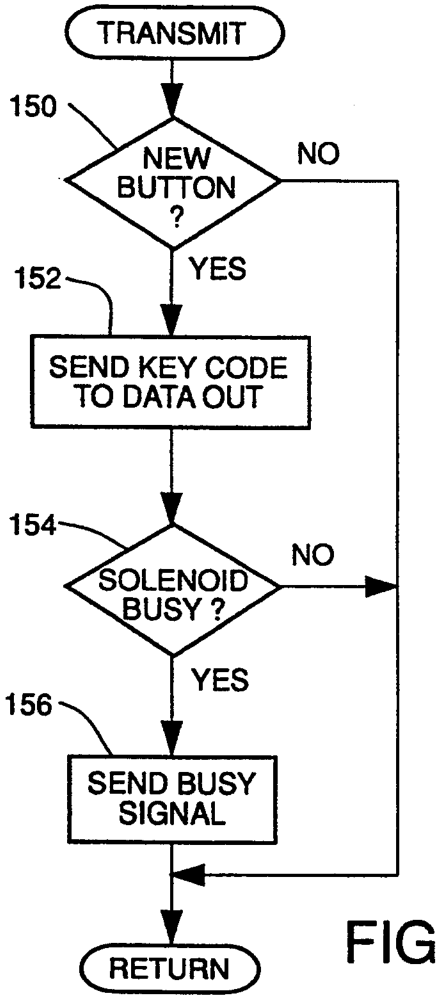

The response of the microprocessor to the data received from a button, as described above, is different from the response to the data transmitted over the transmission lines 28. As shown in FIG. 10, the transmission of data is triggered by a New Button flag <150>. When that flag is set the key code of the button is directed to the data out port for transmission to other units <152>. If, as a result of responding to the key code, the solenoid is being activated to unlock the unit <154>, a busy signal is sent over the line 30 <156>. Rather than transmit the key code from every new button, it may be desired to transmit only those codes which are valid access codes for the unit reading the button code. In that case the block 150, instead of checking the New Button flag, should check for a special Access flag which would be set in response to block 82 of FIG. 6*b* which checks for the match with an access code.

Figure 11:
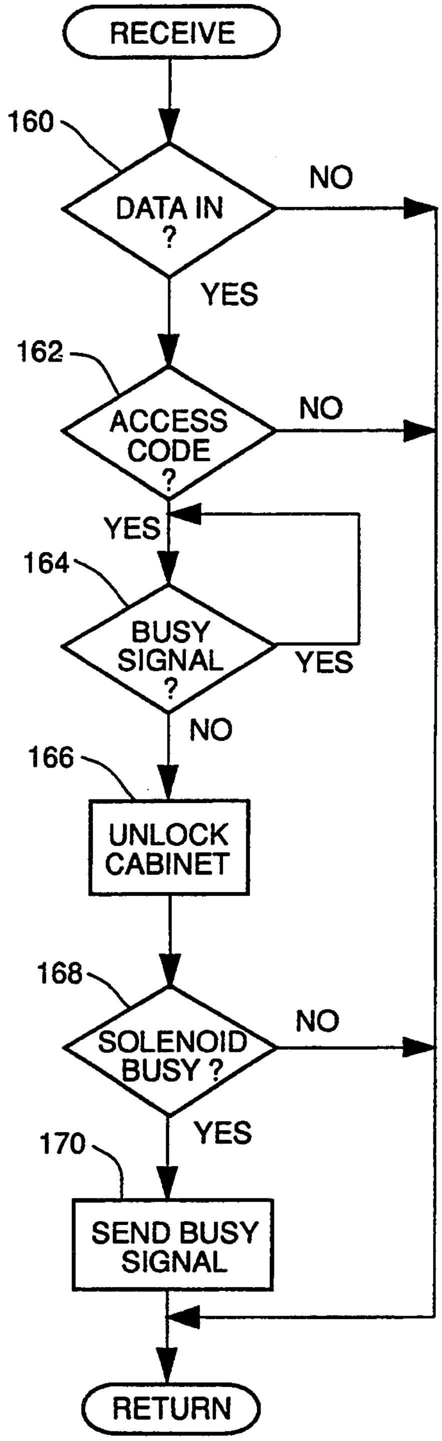

FIG. 11 shows the response of other locks to the transmitted key code. When a key code is received at the data in port <160> the code is compared to the access codes of the receiving lock <162>. If there is a match with an access code, and a busy signal is also received, the program waits until the busy signal turns off <164>. Then the unit is unlocked <166> and as long as its solenoid is busy <168> a busy signal is sent over line 30 <170>.

It will thus be appreciated that the system for linking several electronically locked cabinets or other units enables efficient management of security of the units. The units may be unlocked by addressing only one of them with a key code or key codes which access all or some of the units, yet each unit is selectively programmed to yield access to only specific key codes. The several units are powered by a single low power transformer and to minimize power requirements the unlocking solenoids are prevented from operating concurrently.

I claim:

1. An electronically controlled lock system for a plurality of lockable units comprising:

a plurality of electronic locks, one for each unit;

at least one key with a key code for presentation to the locks;

each lock having means for reading a key code when a key is presented to the lock, a memory containing at least one access code, means for comparing a presented key code and an access code, and means for opening the lock when a presented key code matches an access code; and means for transmitting key codes presented at one lock to locks in other units, whereby any lock having an access code matching a transmitted key code is opened in response to presentation of a key to one lock.

2. The lock system as defined in claim 1 wherein the means for transmitting key codes comprises means for serially transmitting from one unit to another in a predetermined sequence.

3. The lock system as defined in claim 1 wherein the means for transmitting key codes comprises means for serially transmitting in only one direction from one unit to another in a predetermined order.

4. The lock system as defined in claim 1 wherein the means for transmitting key codes comprises means for physically linking one unit to another in a predetermined series.

5. The lock system as defined in claim 4 wherein the means for transmitting sends data in only one direction from the one lock.

6. The lock system as defined in claim 4 wherein the means for transmitting sends data in both directions from the one lock.

7. The lock system as defined in claim 1 wherein the means for transmitting key codes comprises conductors connected between units and the data is transmitted on the conductor as electrical signals.

8. The lock system as defined in claim 1 further including a power supply for providing electrical power directly to one unit, and a plurality of conductors between successive units for transmitting power serially from the one unit to the other units; and the means for transmitting key codes comprises other conductors connected between successive units, and the data is transmitted on the other conductors as electrical signals.

9. The lock system as defined in claim 1 wherein the means for transmitting key codes comprises means for transmitting only key codes which match an access code in the one lock.

10. The lock system as defined in claim 1 wherein the means for transmitting key codes comprises means for transmitting the key code for any key presented to the one lock.

11. An electronically controlled lock system for a plurality of lockable units comprising:

a plurality of electronic locks, one for each unit;

at least one key with a key code for presentation to the locks;

each lock including a microprocessor based circuit including a non-volatile memory for access codes, means for receiving data from a key, an auxiliary data input, a data output, means for comparing a presented key code and an access code, and means for opening the lock when a presented key code matches an access code; and a communication link interconnecting the plurality of locks and coupled to the respective auxiliary data inputs and the data outputs for transmitting key codes from one lock to another.

12. The lock system as defined in claim 11 wherein the circuit includes means for coupling a key code received from a key to the data output for transmission via the communication link.

13. The lock system as defined in claim 11 wherein the circuit includes means for coupling a key code received from a key and which matches an access code in the memory to the data output for transmission via the communication link.

14. The lock system as defined in claim 11 wherein the circuit includes means for coupling a key code received by a data input to the data output for transmission via the communication link.

15. The lock system as defined in claim 11 wherein the circuit includes means for generating a busy signal while opening a lock, means for receiving a busy signal from another lock, and means for preventing operation of the means for opening the lock while receiving a busy signal from another lock, so that only one lock at a time can open; and wherein the communication link couples a busy signal from one lock to the other locks.

16. In a system of electronically locked units and coded keys for opening all or selected units, the method of opening locked units comprising the steps of:

providing the units with individual electronic locks;

linking the electronic locks together for code communication;

programming each unit with at least one access code matching at least one key code;

presenting a key to one of the locks;

reading the key code of the presented key;

comparing the key code to the at least one access code stored in the one lock;

opening the lock when the key code matches the access code;

transmitting the key code from the one lock to other locks linked with the one lock; and comparing the key code to access codes in the other locks and selectively opening locks of the other units when code matches occur.

17. The method as defined in claim 16 wherein the electronic locks are linked together serially: and the transmitting step comprises sequentially transmitting the key code from one lock to the next in the series.

18. The method as defined in claim 16 wherein the electronic locks are linked together serially: and the transmitting step comprises sequentially transmitting the key code in only one direction from one lock to the next in the series, thereby establishing a hierarchy of order in the series such that the lock at just one end of the series can transmit a code to all other locks.

19. The method as defined in claim 16 comprising the steps of:

generating a busy signal by each lock while it is opening and transmitting the busy signal to other locks; and preventing other locks from opening during such a busy signal.

* * * * *